(12) United States Patent
Lee (10) Patent No.: US 9,294,335 B2
(45) Date of Patent: Mar. 22, 2016

(54) PROCESSING LOAD DISTRIBUTION

(75) Inventor: Hyoung-Gon Lee, Seoul (KR)

(73) Assignee: EMPIRE TECHNOLOGY DEVELOPMENT LLC, Wilmington, DE (US)

( * ) Notice: Subject to any disclaimer, the term of this patent is extended or adjusted under 35 U.S.C. 154(b) by 346 days.

(21) Appl. No.: 13/642,816

(22) PCT Filed: Apr. 9, 2012

(86) PCT No.: PCT/US2012/032740
§ 371 (c)(1),
(2), (4) Date: Oct. 22, 2012

(87) PCT Pub. No.: WO2013/154522
PCT Pub. Date: Oct. 17, 2013

(65) Prior Publication Data
US 2013/0268573 A1    Oct. 10, 2013

(51) Int. Cl.
| | |
|---|---|
| *G06F 15/16* | (2006.01) |
| *H04L 29/08* | (2006.01) |
| *H04N 21/24* | (2011.01) |
| *H04N 21/442* | (2011.01) |
| *H04N 21/6379* | (2011.01) |
| *H04N 21/647* | (2011.01) |

(52) U.S. Cl.
CPC ...... *H04L 29/08135* (2013.01); *H04N 21/2402* (2013.01); *H04N 21/4424* (2013.01); *H04N 21/44209* (2013.01); *H04N 21/6379* (2013.01); *H04N 21/64761* (2013.01)

(58) Field of Classification Search
CPC .............. H04L 29/08072; H04L 29/06; H04L 29/08135
USPC .................................................. 709/201–207
See application file for complete search history.

(56) References Cited

U.S. PATENT DOCUMENTS

| | | | | |
|---|---|---|---|---|
| 6,003,065 | A * | 12/1999 | Yan et al. ...................... | 709/201 |
| 6,397,244 | B1 * | 5/2002 | Morimoto et al. ............ | 709/200 |
| 6,401,121 | B1 * | 6/2002 | Yoshida et al. ............... | 709/227 |
| 7,599,985 | B2 * | 10/2009 | Doyle et al. .................. | 709/202 |
| 8,615,652 | B2 * | 12/2013 | Redmond ..................... | 713/153 |
| 8,677,011 | B2 * | 3/2014 | Uchida ......................... | 709/235 |
| 2002/0087667 | A1 * | 7/2002 | Andersen ..................... | 709/220 |
| 2002/0138313 | A1 * | 9/2002 | Fujii et al. ......................... | 705/5 |
| 2003/0154261 | A1 * | 8/2003 | Doyle et al. .................. | 709/218 |
| 2003/0154271 | A1 * | 8/2003 | Baldwin et al. .............. | 709/223 |
| 2004/0024835 | A1 * | 2/2004 | Howard ........................ | 709/213 |
| 2005/0012749 | A1 * | 1/2005 | Gonzalez .................. | G06F 3/14 345/522 |
| 2005/0027794 | A1 * | 2/2005 | Decker ......................... | 709/201 |
| 2005/0081211 | A1 * | 4/2005 | Koga ...................... | G06F 9/5055 718/105 |

(Continued)

OTHER PUBLICATIONS

International Search Report and Written Opinion from International Application No. PCT/US12/32740 mailed Jun. 20, 2012.

(Continued)

*Primary Examiner* — Razu A Miah
(74) *Attorney, Agent, or Firm* — Brundidge & Stanger, P.C.

(57) ABSTRACT

Technologies are generally described for dynamically distributing a processing load. In some examples, a method performed under control of a server may include receiving information regarding load distribution from an end device and dynamically distributing a processing load between the server and the end device based at least in part on the information regarding load distribution.

35 Claims, 9 Drawing Sheets

(56) References Cited

U.S. PATENT DOCUMENTS

| | | | |
|---|---|---|---|
| 2005/0213573 A1* | 9/2005 | Shibata | H04L 45/10 370/389 |
| 2006/0236306 A1* | 10/2006 | DeBruin et al. | 717/113 |
| 2007/0033289 A1 | 2/2007 | Nuyttens et al. | |
| 2007/0121490 A1* | 5/2007 | Iwakawa | H04L 67/1008 370/218 |
| 2007/0174429 A1* | 7/2007 | Mazzaferri et al. | 709/218 |
| 2007/0180452 A1* | 8/2007 | Hirayama et al. | 718/105 |
| 2008/0008086 A1* | 1/2008 | Terasaki | G06F 11/2028 370/216 |
| 2008/0114866 A1* | 5/2008 | Round | 709/223 |
| 2008/0211816 A1* | 9/2008 | Gonzalez | G06F 3/14 345/505 |
| 2008/0301228 A1* | 12/2008 | Flavin | 709/204 |
| 2008/0307108 A1* | 12/2008 | Yan et al. | 709/231 |
| 2009/0156179 A1* | 6/2009 | Hahn et al. | 455/414.1 |
| 2010/0167816 A1* | 7/2010 | Perlman et al. | 463/30 |
| 2010/0293529 A1* | 11/2010 | Austin et al. | 717/113 |
| 2010/0325251 A1* | 12/2010 | Beppu | H04L 67/1002 709/221 |
| 2011/0016172 A1* | 1/2011 | Shah | 709/203 |
| 2011/0078297 A1* | 3/2011 | Tamura | 709/223 |
| 2011/0115800 A1 | 5/2011 | Desai | |
| 2011/0122063 A1* | 5/2011 | Perlman et al. | 345/161 |
| 2011/0283016 A1* | 11/2011 | Uchida | 709/235 |

OTHER PUBLICATIONS

"Distributed Video Game Streaming System for Pervasive Gaming" by J. Jurgelionis, et al.

"Massive Cloud-based GPU Potential for Online Video Via Amazon Services", Christophor Rick, Aug. 2011, http://www.reelseo.com/amazon-cluster-dpu-video-cloud.

"Parallel Rendering with K-Way Replication" by R. Samanta, et al., Princeton University.

* cited by examiner

PROCESSING LOAD DISTRIBUTION

CROSS-REFERENCE TO RELATED APPLICATIONS

This Application is the National Stage filing under 35 U.S.C. §371 of PCT Application Ser. No. PCT/US12/32740 filed on Apr. 9, 2012. The disclosure of the PCT Application is hereby incorporated herein by reference in its entirety.

BACKGROUND

A graphics processing unit (GPU) is a specialized electronic circuit designed to rapidly manipulate and alter memory in order to accelerate the building of images in a frame buffer intended for output to a display. The GPU may be used in embedded systems, mobile phones, personal computers, workstations, game servers, game consoles, and the like. Rendering and encoding processes may be carried out on servers and/or end devices equipped with a GPU, such as mobile phones, personal computers, or game consoles.

SUMMARY

In an example, a method performed under control of a server may include receiving, from an end device, information regarding load distribution and dynamically distributing a processing load between the server and the end device based at least in part on the information regarding load distribution.

In an example, a method performed under control of a server may include processing at least one frame of a first process group and providing an end device with at least one instruction to process at least one frame of a second process group.

In an example, a server may include an information acquisition unit configured to acquire information regarding load distribution and a determining unit configured to dynamically distribute a processing load between the server and an end device based at least in part on the information regarding load distribution.

In an example, a computer-readable storage medium may store thereon computer-executable instructions that, in response to execution, cause a server to perform operations including receiving, from an end device, information regarding load distribution and dynamically distributing a processing load between the server and the end device based at least in part on the information regarding load distribution.

In an example, a computer-readable storage medium may store thereon computer-executable instructions that, in response to execution, cause a server to perform operations including processing at least one frame of a first process group and providing an end device with at least one instruction to process at least one frame of a second process group.

The foregoing summary is illustrative only and is not intended to be in any way limiting. In addition to the illustrative aspects, embodiments, and features described above, further aspects, embodiments, and features will become apparent by reference to the drawings and the following detailed description.

BRIEF DESCRIPTION OF THE FIGURES

The foregoing and other features of this disclosure will become more fully apparent from the following description and appended claims, taken in conjunction with the accompanying drawings. Understanding that these drawings depict only several embodiments in accordance with the disclosure and are, therefore, not to be considered limiting of its scope, the disclosure will be described with additional specificity and detail through use of the accompanying drawings, in which:

DETAILED DESCRIPTION

In the following detailed description, reference is made to the accompanying drawings, which form a part hereof. In the drawings, similar symbols typically identify similar components, unless context dictates otherwise. The illustrative embodiments described in the detailed description, drawings, and claims are not meant to be limiting. Other embodiments may be utilized, and other changes may be made, without departing from the spirit or scope of the subject matter presented herein. It will be readily understood that the aspects of the present disclosure, as generally described herein, and illustrated in the Figures, can be arranged, substituted, combined, separated, and designed in a wide variety of different configurations, all of which are explicitly contemplated herein.

This disclosure is generally drawn, inter alia, to methods, apparatuses, systems, devices, and computer program products related to distribution of a processing load.

Technologies are generally described for a method for distributing a processing load between a server and an end device.

In some examples, a server may dynamically distribute a processing load between the server and an end device based at least in part on information regarding load distribution. By way of example, but not as a limitation, the information regarding load distribution may include a computational capability of the end device and the server, a network status between the server and the end device, a cost information for using the network between the end device and the server, a battery status of the end device, etc. Both the server and the end device may process the dynamically distributed processing load. In some embodiments, the server may process at least one process of the distributed processing load and provide the end device with at least one instruction to process at least one other process of the processing load, which may then be referred to as a distributed processing load. Upon receiving the at least one instruction, the end device may process the at least one other process of the distributed processing load.

Figure 1:
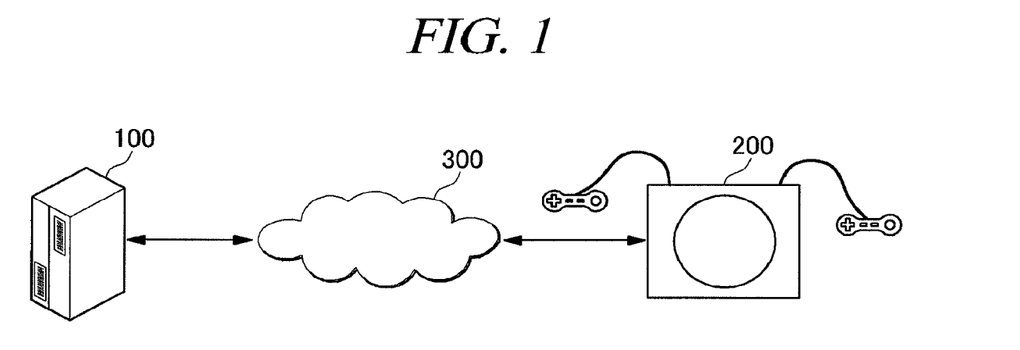
FIG. 1 schematically shows an illustrative example of an environment in which an end device is connected to a server via a network, arranged in accordance with at least some embodiments described herein.

FIG. 1 schematically shows an illustrative example of an environment in which an end device is connected to a server via a network, arranged in accordance with at least some embodiments described herein. As depicted in FIG. 1, an end device 200 may be connected to a server 100 via a network 300. In some embodiments, server 100 may include a cloud server or a component of a cloud system, and end device 200 may be connected to the cloud server or the component of the cloud system via network 300. By way of example, end device 200 may run or execute a graphical game provided by the cloud server or the cloud system. Server 100 and end device 200 may each have a graphics processing unit (GPU).

By way of example, end device 200 may include, but is not limited thereto, a desktop computer, a notebook computer, a laptop computer, a personal portable terminal, a game console or the like. As a personal portable terminal, end device 200 may include all kinds of handheld wireless communication apparatuses such as PCS (Personal Communication System), GMS (Global System for Mobile communications), PDC (Personal Digital Cellular), PHS (Personal Handyphone System), PDA (Personal Digital Assistant) or the like.

By way of example, network 300 may include, but is not limited thereto, a wired network such as LAN (Local Area Network), WAN (Wide Area Network), VAN (Value Added Network) or the like, or all kinds of wireless network such as a mobile radio communication network, a satellite network, a bluetooth, WiBro (Wireless Broadband Internet), Mobile WiMAX, HSDPA (High Speed Downlink Packet Access) or the like.

Server 100 may be configured to receive information regarding load distribution from end device 200. Further, server 100 may be configured to dynamically distribute a processing load between server 100 and end device 200 based at least in part on the information regarding load distribution. The processing load may include a graphical process.

By way of example, but not as a limitation, the information regarding load distribution may include at least one of a status of network 300 between server 100 and end device 200, a status of a battery of end device 200, a capacity of server 100, a capacity of end device 200, cost information of network 300, and user preferences submitted via end device 200.

Figure 2:
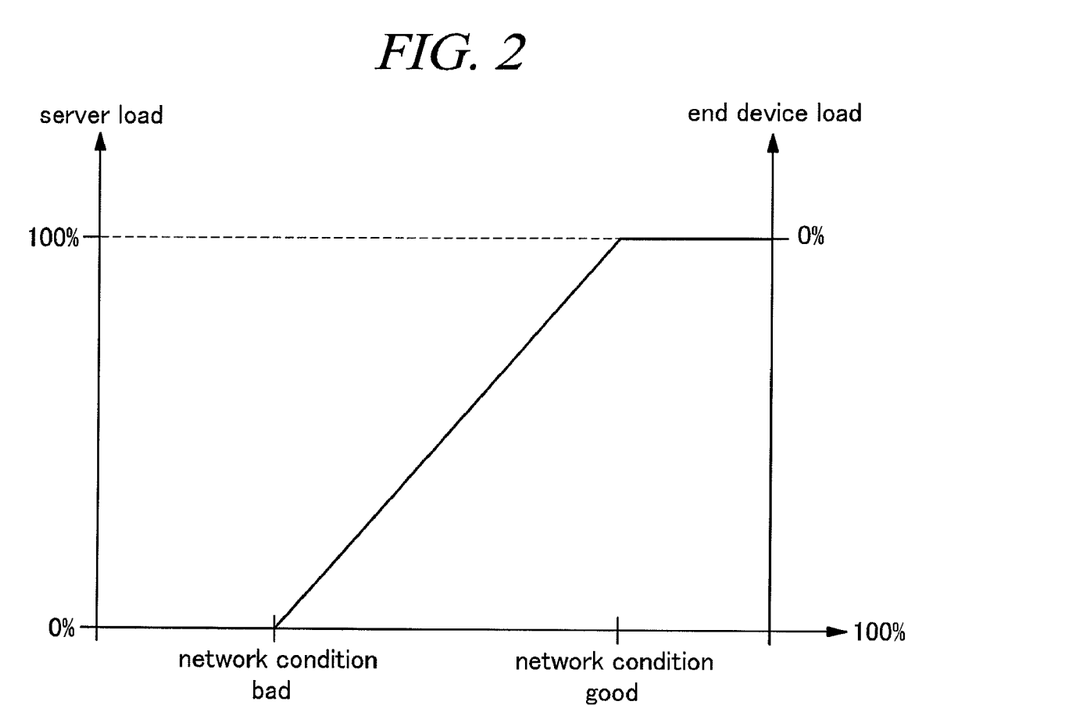
FIG. 2 schematically shows a graph for illustrating distribution of a processing load between a server and an end device based at least in part on a status of a network between the server and the end device, arranged in accordance with at least some embodiments described herein.

FIG. 2 schematically shows a graph for illustrating distribution of a processing load between a server and an end device based at least in part on a status of a network between the server and the end device, arranged in accordance with at least some embodiments described herein. The status of network 300 between server 100 and end device 200 may depend on a bandwidth of network 300. By way of example, if network 300 has enough bandwidth to transmit all data processed by server 100 (i.e., "network condition good" as indicated in the graph of FIG. 2), server 100 may allocate, i.e., retain all processing loads thereat. However, as the bandwidth of network 300 decreases (down to the point of "network condition bad" as indicated in the graph of FIG. 2), server 100 may allocate more of processing loads thereat to end device 200, as opposed to retaining all thereat.

Server 100 may monitor the status of network 300 between server 100 and end device 200 periodically. By way of example, but not as a limitation, server 100 may monitor the status of network 300 at a predetermined time (e.g., once every hour, twice of every hour, etc.). By way of example, but not as a limitation, server 100 may monitor the status of network 300 periodically based on a UDP (User Datagram Protocol) method or a TCP (Transmission Control Protocol) method. End device 200 may also monitor the status of network 300 between server 100 and end device 200 periodically. By way of example, but not as a limitation, end device 200 may monitor the status of network 300 periodically based on a UDP (User Datagram Protocol) method or a TCP (Transmission Control Protocol) method.

Server 100 may request, from end device 200, the information regarding load distribution which may be monitored and acquired by end device 200 periodically, and may dynamically distribute the processing load between server 100 and end device 200 based on the information received from end device 200.

In some embodiments, server 100 may dynamically distribute the processing load between server 100 and end device 200 based on the capacity of server 100. The capacity (which may be a function of data processing) of server 100 may depend on the number of end devices connected to server 100 via network 300. By way of example, but not as a limitation, if the number of end devices connected to server 100 is bigger than a threshold high level of the capacity of server 100, server 100 may decrease the processing load of server 100 and increase the processing load of end device 200.

In some embodiments, server 100 may dynamically distribute the processing load between server 100 and end device 200 based on a status of a battery of end device 200. By way of example, but not as a limitation, if an estimated remaining battery life of end device 200 is sufficient for estimated processing needs, server 100 may increase the processing load of end device 200; but if an estimated battery life of end device 200 is not sufficient for estimated processing needs, server 100 may decrease the processing load of end device 200.

In some embodiments, server 100 may dynamically distribute the processing load between server 100 and end device 200 based on a capacity (which may be a function of data processing) of end device 200. By way of example, but not as a limitation, if a process of end device 200 is already occupied by other process, server 100 may decrease the processing load of end device 200.

In some embodiments, server 100 may dynamically distribute the processing load between server 100 and end device 200 based on cost information of network 300. By way of example, but not as a limitation, cost of using network 300 may vary depending on a network provider, a location of end device 200, and a time zone in which end device 200 is connected to network 300. By way of example, but not as a limitation, if the cost of using network 300 is relatively high, server 100 may decrease the processing load of server 100, and if the cost of using network 300 is relatively low, server 100 may increase the processing load of server 100.

In some embodiments, server 100 may dynamically distribute the processing load between server 100 and end device 200 based on user preferences submitted via end device 200. By way of example, if a user of end device 200 wants server 100 to process all of processes, server 100 may retain all of the processing load for processing thereat.

Server 100 may acquire the information regarding load distribution by itself or may request the information regarding load distribution from end device 200. By way of example, server 100 may acquire the information regarding load distribution periodically by itself. Further, server 100 may request the information regarding load distribution periodically from end device 200.

In some embodiments, if a special event occurs on either server 100 or end device 200, server 100 or end device 200 may inform the other of such a special event. Thus, end device 200 may inform server 100 of the event on end device 200; or server 100 may inform end device 200 of the event on server 100. By way of example, but not as a limitation, when the battery of end device 200 is completely discharged or at or beyond a threshold low level, end device 200 may inform server 100 of the battery status. Accordingly, by such non-limiting example, server 100 may distribute a processing load between server 100 and end device 200 based on information regarding the battery status.

Figure 3:
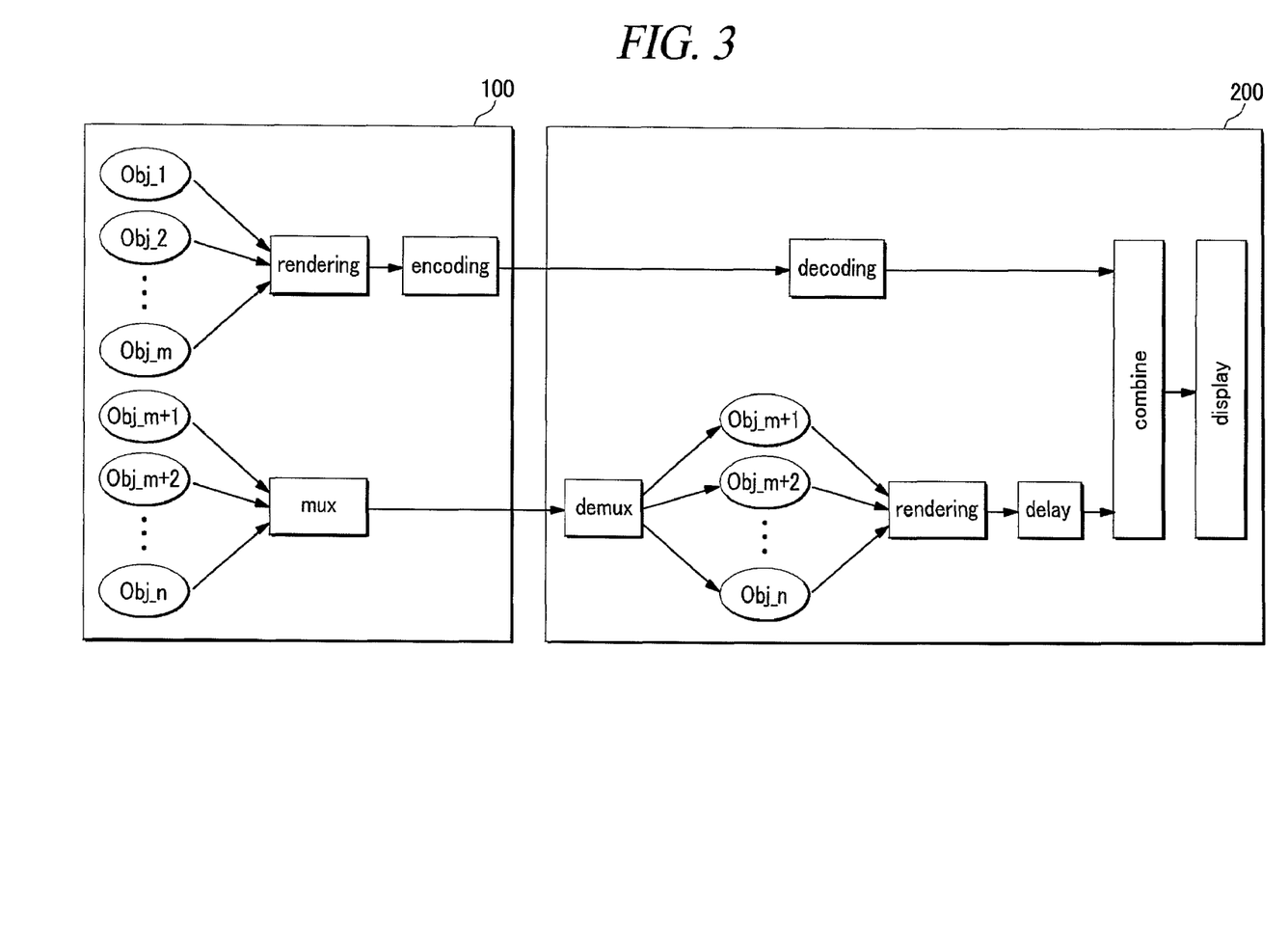
FIG. 3 schematically shows an illustrative example of a server and an end device for processing a distributed processing load, arranged in accordance with at least some embodiments described herein.

FIG. 3 schematically shows an illustrative example of a server and an end device for processing a distributed processing load, arranged in accordance with at least some embodiments described herein. Server 100 may process at least one process of the processing load, which may be distributed based on the information regarding load distribution. Further, server 100 may provide end device 200 with at least one instruction to process at least one other process of the distributed processing load. Each of the at least one process and the at least one other process may be a graphical object.

In some embodiments, server 100 may determine a number of graphical objects to be rendered by server 100 depending on a processing load between server 100 and end device 200. By way of example, server 100 may render graphical objects (i.e., from Obj_1 to Obj_m) corresponding to a processing load ratio of server 100. In accordance with the example, server 100 may encode the rendered graphical objects into a data stream and transmit the data stream to end device 200. Further, server 100 may transmit, to end device 200, graphical objects (i.e., from Obj_m+1 to Obj_n) corresponding to a processing load ratio of end device 200 rather than rendering the graphical objects (i.e., from Obj_m+1 to Obj_n).

In some embodiments, end device 200 may decode the data stream received from server 100 so as to acquire the rendered graphical objects (i.e., from Obj_1 to Obj_m). Further, end device 200 may receive and render the graphical objects (i.e., from Obj_m+1 to Obj_n). End device 200 may then combine/overlay the graphical objects (i.e., from Obj_1 to Obj_m) rendered by server 100 with the graphical objects (i.e., from Obj_m+1 to Obj_n) rendered by end device 200 and display the combined/overlaid graphical objects (i.e., from Obj_1 to Obj_n). Further, since it is necessary for server 100 to encode the graphical objects (i.e., from Obj_1 to Obj_m) and for end device 200 to decode the encoded graphical objects, a delay step may be necessary after end device 200 renders the graphical objects (i.e., from Obj_m+1 to Obj_n).

In some embodiments, if server 100 retains 50% of an entire processing load and distributes 50% of the entire processing load to end device 200, server 100 may, e.g., render and encode odd frames of video data and transmit a stream of the encoded video data to end device 200, and server 100 may transmit even frames of the video data to end device 200 rather than rendering the even frames of the video data.

In some embodiments, server 100 may render and encode foreground objects of a video scene and transmit the encoded foreground objects of the video scene to end device 200, and server 100 may further transmit background objects of the video scene to end device 200 rather than rendering the background objects of the video scene. However, server 100 may also render and encode the background objects of the video scene and transmit the encoded background objects of the video scene to end device 200. Further, server 100 may transmit the foreground objects of the video scene to end device 200 rather than rendering the foreground objects of the video scene.

Figure 4:
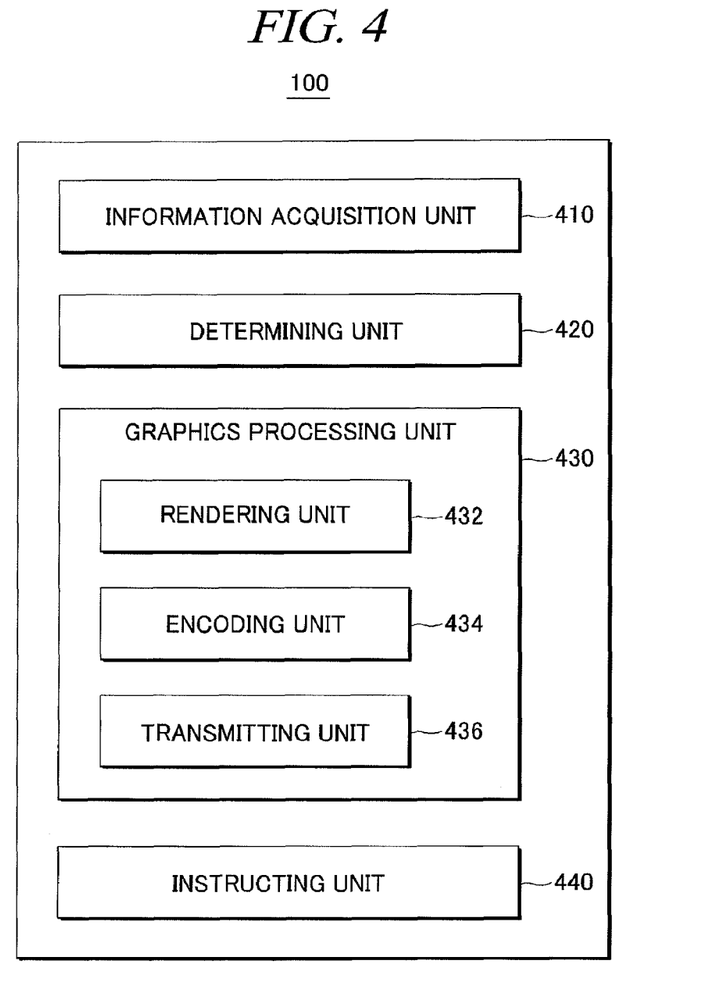
FIG. 4 shows a schematic block diagram illustrating an example architecture for a server, arranged in accordance with at least some embodiments described herein.

FIG. 4 shows a schematic block diagram illustrating an example architecture for a server, arranged in accordance with at least some embodiments described herein. As depicted in FIG. 4, server 100 may include an information acquisition unit 410, a determining unit 420, a graphics processing unit 430 and an instructing unit 440. Graphics processing unit 430 may include a rendering unit 432, an encoding unit 434 and a transmitting unit 436. Although illustrated as discrete components, various components may be divided into additional components, combined into fewer components, or eliminated altogether while being contemplated within the scope of the disclosed subject matter.

Information acquisition unit 410 may be configured to receive information regarding load distribution from end device 200. By way of example, but not as a limitation, the information regarding load distribution may include at least one of a status of a network between server 100 and end device 200, a status of a battery of end device 200, a capacity of server 100, a capacity of end device 200, cost information of the network and user preferences submitted via end device 200. Information acquisition unit 410 may acquire the information regarding load distribution from end device 200 periodically.

Determining unit 420 may be configured to dynamically distribute a processing load between server 100 and end device 200 based at least in part on the information regarding load distribution. The dynamically distributed processing load may be associated with at least one of a graphical object and a frame type of video data.

Graphics processing unit 430 may process at least a portion of the dynamically distributed processing load which is retained at server 100. By way of example, but not as a limitation, the dynamically distributed processing load is associated with a graphical object. In some embodiments, rendering unit 432 may render at least one graphical object which is retained for rendering at server 100. Encoding unit 434 may encode the rendered graphical object into a data stream. Transmitting unit 436 may transmit the data stream to end device 200.

Instructing unit 440 may instruct end device 200 to process at least one other portion of the dynamically distributed processing load which is distributed to end device 200. Per instructions of instructing unit 440 of server 100, end device 200 may render at least one graphical object which is distributed to end device 200. Then, end device 200 may combine the at least one graphical object rendered by itself and the at least one graphical object rendered by server 100 to display the combined data.

Figure 5:
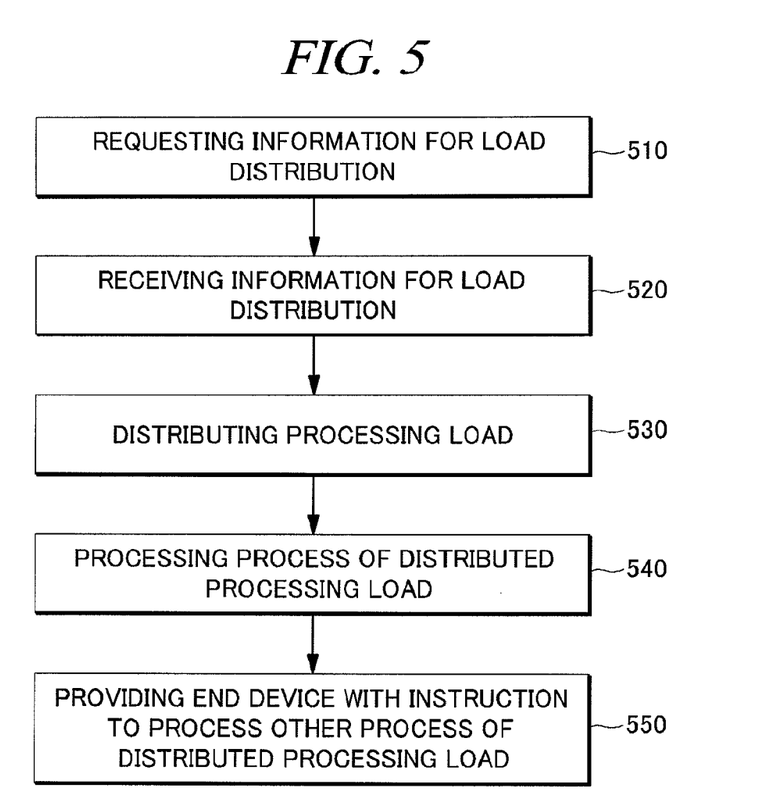
FIG. 5 shows an example flow diagram of a process of a server for dynamically distributing a processing load, arranged in accordance with at least some embodiments described herein.

FIG. 5 shows an example flow diagram of a process of a server for dynamically distributing a processing load, arranged in accordance with at least some embodiments described herein. The process in FIG. 5 may be implemented in server 100 including information acquisition unit 410; determining unit 420; graphics processing unit 430, which includes rendering unit 432, encoding unit 434 and transmitting unit 436; and instructing unit 440 discussed above. An example process may include one or more operations, actions, or functions as illustrated by one or more blocks 510, 520, 530, 540 and/or 550. Although illustrated as discrete blocks, various blocks may be divided into additional blocks, combined into fewer blocks, or eliminated, depending on the desired implementation. Processing may begin at block 510.

At block 510, server 100 may request information regarding load distribution from end device 200. By way of example, but not as a limitation, server 100 may send a request for the information to end device 200 periodically. The processing load to be distributed may include a graphical process. The requested information regarding load distribution may include at least one of a status of a network between server 100 and end device 200, a status of a battery of end device 200, a capacity of server 100, a capacity of end device 200, cost information of the network, user preferences submitted via end device 200, or the like. Processing may continue from block 510 to block 520.

At block 520, server 100 may receive the information regarding load distribution from end device 200. Processing may continue from block 520 to block 530.

At block 530, server 100 may dynamically distribute a processing load between server 100 and end device 200 based at least in part on the information regarding load distribution received at block 520. By way of example, but not as a limitation, server 100 may determine a number of graphical objects to be rendered by server 100 depending on a processing load ratio between server 100 and end device 200. In some embodiments, server 100 may determine a number of frames of video data to be rendered by server 100 depending on a processing load ratio between server 100 and end device 200. Processing may continue from block 530 to block 540.

At block 540, server 100 may process at least one process of the distributed processing load. In some embodiments, server 100 may render the graphical objects which are distributed to server 100, encode the rendered graphical objects into a data stream, and then transmit the data stream to end device 200. Processing may continue from block 540 to block 550.

At block 550, server 100 may provide end device 200 with at least one instruction to process at least one other process of the distributed processing load. By way of example, but not as a limitation, server 100 may provide end device 200 with an instruction to render other graphical objects that are not rendered by server 100.

One skilled in the art will appreciate that, for this and other processes and methods disclosed herein, the functions performed in the processes and methods may be implemented in differing order. Furthermore, the outlined steps and operations are only provided as examples, and some of the steps and operations may be optional, combined into fewer steps and operations, or expanded into additional steps and operations without detracting from the essence of the disclosed embodiments.

Figure 6:
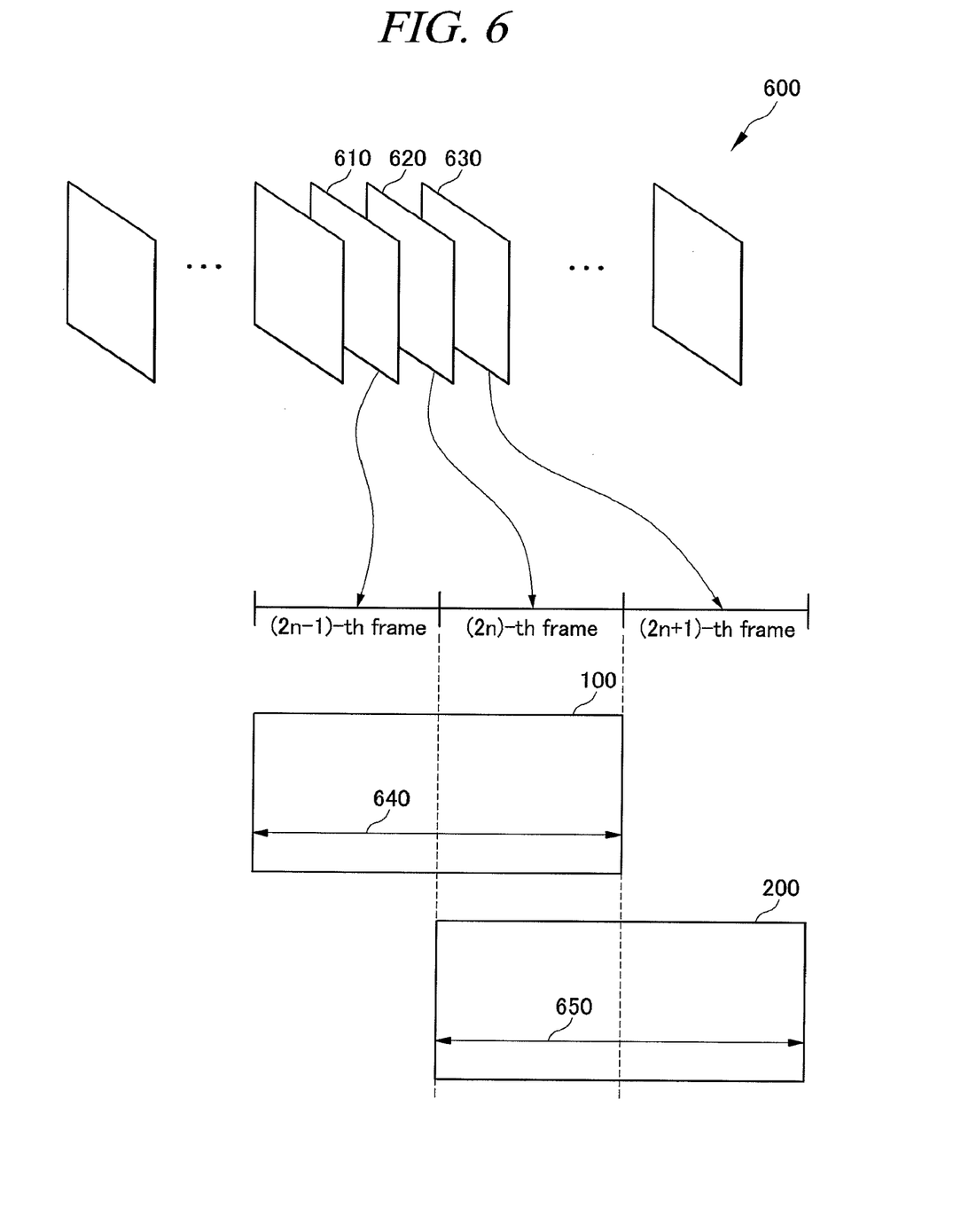
FIG. 6 schematically shows video data frames that may be dynamically distributed between a server and an end device, arranged in accordance with at least some embodiments described herein.

FIG. 6 schematically shows video data frames which are dynamically distributed between a server and an end device, arranged in accordance with at least some embodiments described herein. Video data 600 may be comprised of multiple frames including a (2n−1)-th frame 610, a (2n)-th frame 620 and a (2n+1)-th frame 630.

In some embodiments, the multiple frames of video data 600 may be divided into a first process group and a second process group. By way of example, but not as a limitation, the first process group may include odd frames including (2n−1)-th frame 610 and (2n+1)-th frame 630 and the second process group may include even frames including (2n)-th frame 620. Further, the first process group may include even frames including (2n)-th frame 620 and the second process group may include odd frames including (2n−1)-th frame 610 and (2n+1)-th frame 630. Server 100 may process the first process group and end device 200 may process the second process group.

As depicted in FIG. 6, server 100 may process (2n−1)-th frame 610 during a period 640 which corresponds to (2n−1)-th frame and (2n)-th frame. Similarly, end device 200 may process (2n)-th frame 620 during a period 650 of which corresponds to (2n)-th frame and (2n+1)-th frame. More particularly, server 100 may render (2n−1)-th frame 610, encode the rendered frame into a data stream and transmit the data stream to end device 200 during period 640, and end device 200 may receive (2n)-th frame 620 from server 100 and render (2n)-th frame 620 during period 650. Since the frame rendered by server 100 may be transmitted during two frames, a peak load of network bandwidth may be lowered by half. Further, since end device 200 may render the frame received from server 100 during two frames, a peak load of capacity of end device 200 may be lowered by half.

Although, it is described that server 100 processes odd frames or even frames and end device 200 processes even frames or odd frames, it is apparent to those skilled in the art that a type or a number of frames which are processed by server 100 and end device 200 may be changed based at least in part on the information regarding load distribution. By way of example, but not as a limitation, server 100 may process (2n−1)-th frame 610 and (2n)-th frame 620 and end device 200 may process (2n+1)-th frame 630.

In some embodiments, the multiple frames of video data 600 may include two or more types of frames. By way of example, but not as a limitation, the multiple frames may include at least one frame of a first type, which may be suited for processing on a first processing unit, and at least one other frame of a second type, which may be suited for processing on a second processing unit. By way of example, but not as a limitation, the at least one frame of the first type may include an independent frame including an intracoded frame (I-frame) and the at least one other frame of the second type may include a dependent frame including at least one of a predicted frame (P-frame) and a bidirectional frame (B-frame). The first processing unit may be a graphics processing unit (GPU) and the second processing unit may be a central processing unit (CPU). In some embodiments, each of server 100 and end device 200 may include at least one of the first processing unit and the second processing unit. By way of example, but not as a limitation, if server 100 has the first processing unit only and end device has the second processing unit only, processing of the at least one frame of the first type may be allocated to server 100 and processing of the at least one other frame of the second type may be allocated to end device 200. When each of server 100 and end device 200 has both of the first processing unit and the second processing unit, the at least one frame of the first type and the at least one other frame of the second type may be distributed between server 100 and end device 200, based at least in part on the information regarding load distribution, as described above with reference FIG. 2.

Figure 7:
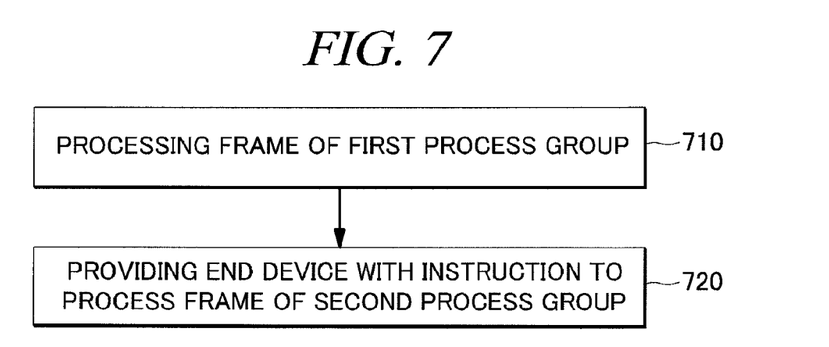
FIG. 7 shows another example flow diagram of a process of a server for dynamically distributing a processing load, arranged in accordance with at least some embodiments described herein.

FIG. 7 shows another example flow diagram of a process of a server for dynamically distributing a processing load, arranged in accordance with at least some embodiments described herein. The process in FIG. 7 may be implemented in server 100 including information acquisition unit 410; determining unit 420; graphics processing unit 430, which includes rendering unit 432, encoding unit 434 and transmitting unit 436; and instructing unit 440 discussed above. Although illustrated as discrete blocks, various blocks may be divided into additional blocks, combined into fewer blocks, or eliminated, depending on the desired implementation. Processing may begin at block 710.

At block 710, server 100 may process at least one frame of a first process group. In some embodiments, the first process group may comprise at least one odd frame of video data. Further, in some other embodiments, the first process group may comprise at least one frame of a first type, which may be suited for processing on a first processing unit which may be a graphics processing unit (GPU). For example, the at least one frame of the first type may include an independent frame including an I-frame. By way of examples, if server 100 has the first processing unit, processing of the at least one frame of the first type may be allocated to server 100 and server 100 may process the at least one frame of the first process group. Processing may continue from block 710 to block 720.

At block 720, server 100 may provide end device 200 with at least one instruction to process at least one frame of a second process group. In some embodiments, the second process group may comprise at least one even frame of the vide data. Further, in some other embodiments, the second process group may comprise at least one other frame of a second type, which may be suited for processing on a second processing unit which may be a central processing unit (CPU). For example, the at least one other frame of the second type may include a dependent frame including at least one of a P-frame and a B-frame. By way of examples, if end device 200 has the second processing unit, processing of the at least one other frame of the second type may be allocated to end device 200. Server 100 may provide end device 200 with at least one instruction to process the at least one frame of the second process group.

In some embodiments, the at least one odd frame may include a first frame and a third frame and the at least one even frame includes a second frame. In such cases, server 100 may render the first frame, encode the rendered first frame into a data stream and transmit the data stream to end device 200 during a period of the first frame and the second frame. Further, end device 200 may receive and render the second frame during a period of the second frame and the third frame.

One skilled in the art will appreciate that, for this and other processes and methods disclosed herein, the functions performed in the processes and methods may be implemented in differing order. Furthermore, the outlined steps and operations are only provided as examples, and some of the steps and operations may be optional, combined into fewer steps and operations, or expanded into additional steps and operations without detracting from the essence of the disclosed embodiments.

Figure 8:
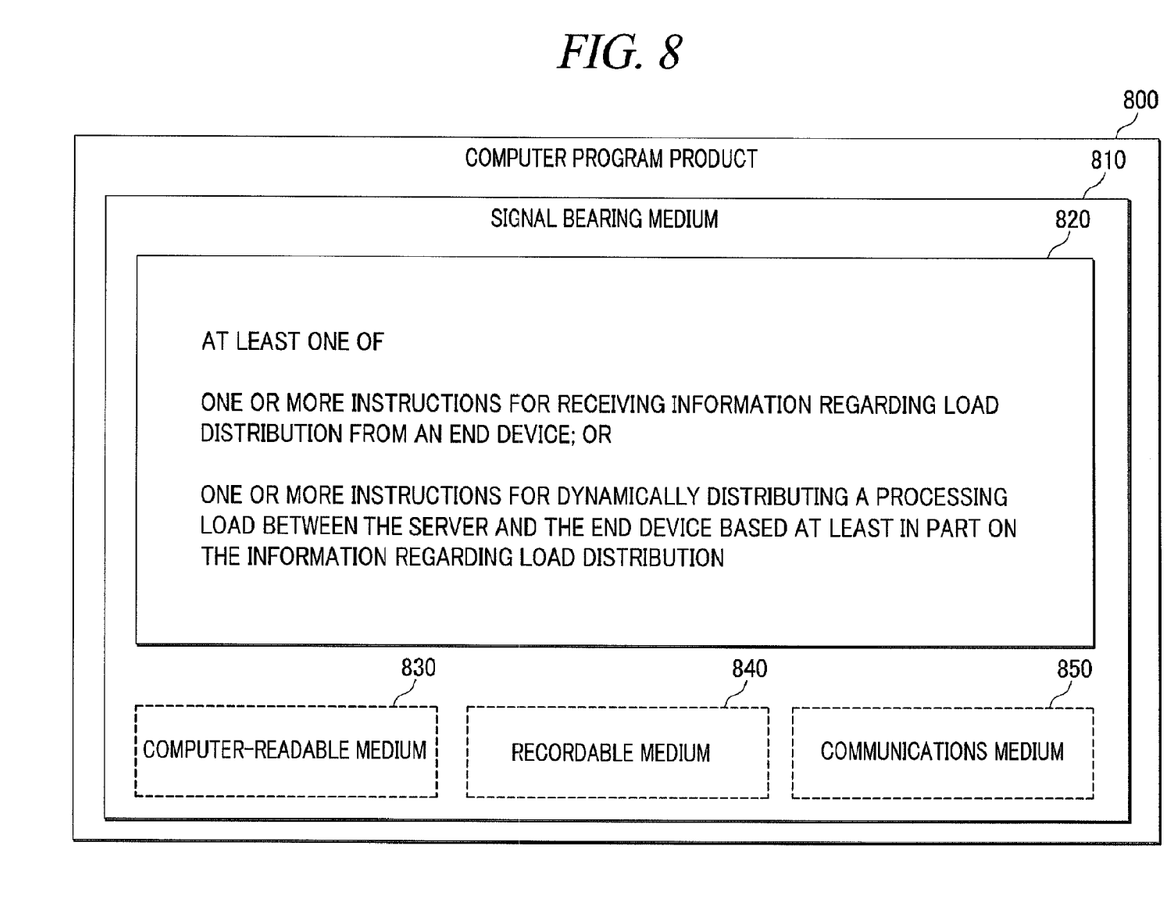
FIG. 8 illustrates a computer program product that may be utilized to dynamically distribute a processing load, arranged in accordance with at least some embodiments described herein.

FIG. 8 illustrates a computer program product that may be utilized to dynamically distribute a processing load in accordance with at least some embodiments described herein. Computer program product 800 may include a signal bearing medium 810. Signal bearing medium 810 may include one or more instructions 820 that, when executed by, for example, a processor, may provide the functionality described above with respect to FIGS. 1-7. By way of example, instructions 820 may include: one or more instructions for receiving information regarding load distribution from an end device and one or more instructions for dynamically distributing a processing load between the server and the end device based at least in part on the information regarding load distribution. Thus, for example, referring to FIG. 4, server 100 may undertake one or more of the blocks shown in FIG. 5 in response to instructions 820.

In some implementations, signal bearing medium 810 may encompass a computer-readable medium 830, such as, but not limited to, a hard disk drive, a CD, a DVD, a digital tape, memory, etc. In some implementations, signal bearing medium 810 may encompass a recordable medium 840, such as, but not limited to, memory, read/write (R/W) CDs, R/W DVDs, etc. In some implementations, signal bearing medium 810 may encompass a communications medium 850, such as, but not limited to, a digital and/or an analog communication medium (e.g., a fiber optic cable, a waveguide, a wired communications link, a wireless communication link, etc.). Thus, for example, program product 800 may be conveyed to one or more modules of server 100 by an RF signal bearing medium 810, where the signal bearing medium 810 is conveyed by a wireless communications medium 850 (e.g., a wireless communications medium conforming with the IEEE 802.11 standard).

Figure 9:
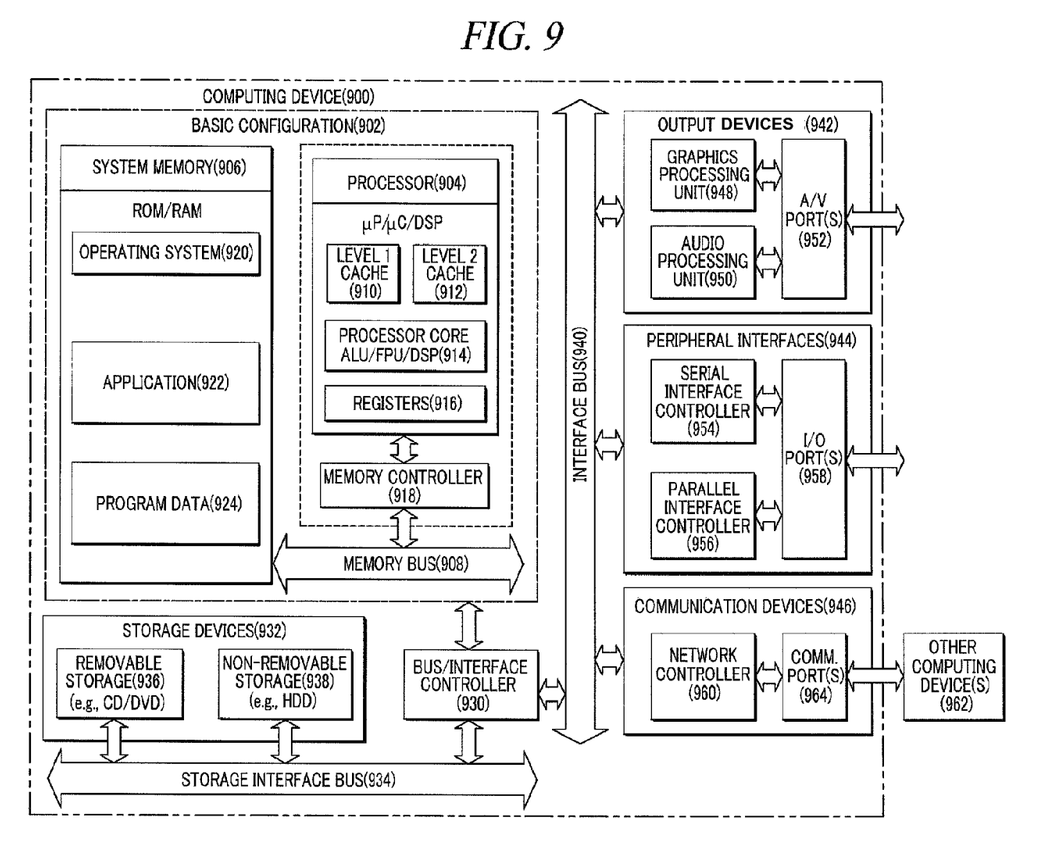
FIG. 9 is a block diagram illustrating an example computing device that may be utilized to dynamically distribute a processing load, arranged in accordance with at least some embodiments described herein.

FIG. 9 is a block diagram illustrating an example computing device 900 that may be utilized to dynamically distribute a processing load in accordance with at least some embodiments described herein. In a very basic configuration 902, computing device 900 typically includes one or more processors 904 and a system memory 906. A memory bus 908 may be used for communicating between processor 904 and system memory 906.

Depending on the desired configuration, processor 904 may be of any type including but not limited to a microprocessor ($\mu$P), a microcontroller ($\mu$C), a digital signal processor (DSP), or any combination thereof. Processor 904 may include one or more levels of caching, such as a level one cache 910 and a level two cache 912, a processor core 914, and registers 916. An example processor core 914 may include an arithmetic logic unit (ALU), a floating point unit (FPU), a digital signal processing core (DSP Core), or any combination thereof. An example memory controller 918 may also be used with processor 904, or in some implementations memory controller 918 may be an internal part of processor 904.

Depending on the desired configuration, system memory 906 may be of any type including but not limited to volatile memory (such as RAM), non-volatile memory (such as ROM, flash memory, etc.) or any combination thereof. System memory 906 may include an operating system 920, one or more applications 922, and program data 924.

Computing device 900 may have additional features or functionality, and additional interfaces to facilitate communications between basic configuration 902 and any required devices and interfaces. For example, a bus/interface controller 930 may be used to facilitate communications between basic configuration 902 and one or more data storage devices 932 via a storage interface bus 934. Data storage devices 932 may be removable storage devices 936, non-removable storage devices 938, or a combination thereof. Examples of removable storage and non-removable storage devices include magnetic disk devices such as flexible disk drives and hard-disk drives (HDD), optical disk drives such as compact disk (CD) drives or digital versatile disk (DVD) drives, solid state drives (SSD), and tape drives to name a few. Example computer storage media may include volatile and nonvolatile, removable and non-removable media implemented in any method or technology for storage of information, such as computer readable instructions, data structures, program modules, or other data.

System memory 906, removable storage devices 936 and non-removable storage devices 938 are examples of computer storage media. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which may be used to store the desired information and which may be accessed by computing device 900. Any such computer storage media may be part of computing device 900.

Computing device 900 may also include an interface bus 940 for facilitating communication from various interface devices (e.g., output devices 942, peripheral interfaces 944, and communication devices 946) to basic configuration 902 via bus/interface controller 930. Example output devices 942 include a graphics processing unit 948 and an audio processing unit 950, which may be configured to communicate to various external devices such as a display or speakers via one or more A/V ports 952. Example peripheral interfaces 944 include a serial interface controller 954 or a parallel interface controller 956, which may be configured to communicate with external devices such as input devices (e.g., keyboard, mouse, pen, voice input device, touch input device, etc.) or other peripheral devices (e.g., printer, scanner, etc.) via one or more I/O ports 958. An example communication device 946 includes a network controller 960, which may be arranged to facilitate communications with one or more other computing devices 962 over a network communication link via one or more communication ports 964.

The network communication link may be one example of a communication media. Communication media may typically be embodied by computer readable instructions, data structures, program modules, or other data in a modulated data signal, such as a carrier wave or other transport mechanism, and may include any information delivery media. A "modulated data signal" may be a signal that has one or more of its characteristics set or changed in such a manner as to encode information in the signal. By way of example, and not limitation, communication media may include wired media such as a wired network or direct-wired connection, and wireless media such as acoustic, radio frequency (RF), microwave, infrared (IR) and other wireless media. The term computer readable media as used herein may include both storage media and communication media.

Computing device 900 may be implemented as a portion of a small-form factor portable (or mobile) electronic device such as a cell phone, a personal data assistant (PDA), a personal media player device, a wireless web-watch device, a personal headset device, an application specific device, or a hybrid device that include any of the above functions. Computing device 900 may also be implemented as a personal computer including both laptop computer and non-laptop computer configurations.

The present disclosure is not to be limited in terms of the particular embodiments described in this application, which are intended as illustrations of various aspects. Many modifications and variations can be made without departing from its spirit and scope, as will be apparent to those skilled in the art. Functionally equivalent methods and apparatuses within the scope of the disclosure, in addition to those enumerated herein, will be apparent to those skilled in the art from the foregoing descriptions. Such modifications and variations are intended to fall within the scope of the appended claims. The present disclosure is to be limited only by the terms of the appended claims, along with the full scope of equivalents to which such claims are entitled. It is to be understood that this disclosure is not limited to particular methods, reagents, compounds, compositions or biological systems, which can, of course, vary. It is also to be understood that the terminology used herein is for the purpose of describing particular embodiments only, and is not intended to be limiting.

With respect to the use of substantially any plural and/or singular terms herein, those having skill in the art can translate from the plural to the singular and/or from the singular to the plural as is appropriate to the context and/or application. The various singular/plural permutations may be expressly set forth herein for sake of clarity.

It will be understood by those within the art that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to embodiments containing only one such recitation, even when the same claim includes the introductory phrases "one or more" or "at least one" and indefinite articles such as "a" or "an" (e.g., "a" and/or "an" should be interpreted to mean "at least one" or "one or more"); the same holds true for the use of definite articles used to introduce claim recitations. In addition, even if a specific number of an introduced claim recitation is explicitly recited, those skilled in the art will recognize that such recitation should be interpreted to mean at least the recited number (e.g., the bare recitation of "two recitations," without other modifiers, means at least two recitations, or two or more recitations). Furthermore, in those instances where a convention analogous to "at least one of A, B, and C, etc." is used, in general such a construction is intended in the sense one having skill in the art would understand the convention (e.g., "a system having at least one of A, B, and C" would include but not be limited to systems that have A alone, B alone, C alone, A and B together, A and C together, B and C together, and/or A, B, and C together, etc.). In those instances where a convention analogous to "at least one of A, B, or C, etc." is used, in general such a construction is intended in the sense one having skill in the art would understand the convention (e.g., "a system having at least one of A, B, or C" would include but not be limited to systems that have A alone, B alone, C alone, A and B together, A and C together, B and C together, and/or A, B, and C together, etc.). It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B."

In addition, where features or aspects of the disclosure are described in terms of Markush groups, those skilled in the art will recognize that the disclosure is also thereby described in terms of any individual member or subgroup of members of the Markush group.

As will be understood by one skilled in the art, for any and all purposes, such as in terms of providing a written description, all ranges disclosed herein also encompass any and all possible subranges and combinations of subranges thereof. Any listed range can be easily recognized as sufficiently describing and enabling the same range being broken down into at least equal halves, thirds, quarters, fifths, tenths, etc. As a non-limiting example, each range discussed herein can be readily broken down into a lower third, middle third and upper third, etc. As will also be understood by one skilled in the art all language such as "up to," "at least," and the like include the number recited and refer to ranges which can be subsequently broken down into subranges as discussed above. Finally, as will be understood by one skilled in the art, a range includes each individual member. Thus, for example, a group having 1-3 cells refers to groups having 1, 2, or 3 cells. Similarly, a group having 1-5 cells refers to groups having 1, 2, 3, 4, or 5 cells, and so forth.

From the foregoing, it will be appreciated that various embodiments of the present disclosure have been described herein for purposes of illustration, and that various modifications may be made without departing from the scope and spirit of the present disclosure. Accordingly, the various embodiments disclosed herein are not intended to be limiting, with the true scope and spirit being indicated by the following claims.

What is claimed is:

1. A method performed under control of a server, comprising:
   receiving, from an end device, information regarding load distribution; determining a processing load between the server and the end device by determining a portion of the processing load that is to be processed at the server and another portion of the processing load that is to be processed at the end device based at least in part on the information regarding load distribution;
   dynamically distributing the determined processing load between the server and the end device,
   wherein the information regarding load distribution includes at least one of a status of a network between the server and the end device, a status of a battery of the end device, a capacity of the server, a capacity of the end device, cost information of the network, and user preferences submitted via the end device;
   processing at least one process of the distributed processing load; and providing the end device with at least one instruction to process at least one other process of the distributed processing load,
   wherein each of the at least one process is associated with one of a background object or a foreground object of a video scene, and each of the at least one other process is associated with another one of the background object or the foreground object of the video scene.

2. The method of claim 1, wherein the distributed processing load includes a graphical process.

3. The method of claim 2, wherein the server and the end device have at least one of a central processing unit (CPU) and a graphics processing unit (GPU), respectively.

4. The method of claim 1, wherein the capacity of the server is associated with a number of end devices connected to the server.

5. The method of claim 1, further comprising:
   requesting the information regarding load distribution from the end device prior to the receiving of the information regarding load distribution.

6. The method of claim 5, wherein the requesting is performed periodically.

7. The method of claim 1, wherein each of the at least one process and the at least one other process is associated with a graphical object.

8. The method of claim 7, wherein the processing of the at least one process and the processing of the at least one other process comprise rendering the graphical object, and wherein the processing of the at least one process further comprises encoding the rendered graphical object into a data stream and transmitting the data stream to the end device.

9. A method performed under control of a server, comprising:
   processing at least one frame of a first process group;
   providing an end device with at least one instruction to process at least one frame of a second process group;
   receiving, from the end device, information regarding load distribution; and dynamically determining the first process group and the second process group based at least in part on the information regarding load distribution, wherein the first process group is processed by the server and the second process group is processed by the end device,
   wherein the information regarding load distribution includes at least one of a status of a network between the server and the end device, a status of a battery of the end device, a capacity of the server, a capacity of the end device, cost information of the network, and user preferences submitted via the end device, and
   wherein each of the at least one frame of the first process group is associated with one of a background object or a foreground object of a video scene, and each of the at least one frame of the second process group is associated with another one of the background object or the foreground object of the video scene.

10. The method of claim 9, wherein the first process group comprises at least one odd frame of video data and the second process group comprises at least one even frame of the video data.

11. The method of claim 10, wherein the at least one odd frame includes a first frame and the at least one even frame includes a second frame, and
   wherein the processing includes rendering the first frame and transmitting the rendered first frame during a period of the first frame and the second frame.

12. The method of claim 11, wherein the at least one odd frame further includes a third frame, and
   wherein the providing includes providing the end device with an instruction to render the second frame during a period of the second frame and the third frame.

13. The method of claim 9, wherein the distributed processing load includes a graphical process.

14. The method of claim 9, wherein the server comprises a first processing unit that processes the at least one frame of the first process group, and
   wherein the end device comprises a second processing unit that processes the at least one frame of the second process group.

15. The method of claim 14, wherein the at least one frame of the first process group includes an independent frame, and
   wherein the at least one frame of the second process group includes a dependent frame.

16. The method of claim 15, wherein the independent frame includes an intracoded frame (I-frame) and the dependent frame includes at least one of a predicted frame (P-frame) and a bidirectional frame (B-frame).

17. The method of claim 14, wherein the at least one frame of the first process group includes a dependent frame, and
   wherein the at least one frame of the second process group includes an independent frame.

18. The method of claim 17, wherein the independent frame includes an intracoded frame (I-frame) and the dependent frame includes at least one of a predicted frame (P-frame) and a bidirectional frame (B-frame).

19. The method of claim 14, further comprising:
dynamically distributing a process load between the first process group and the second process group based at least in part on the first processing unit and the second processing unit.

20. The method of claim 14, wherein the server further comprises the second processing unit that processes at least one other frame of the first process group.

21. The method of claim 14, wherein the end device further comprises the first processing unit that processes at least one other frame of the second process group.

22. A server, comprising:
a memory;
at least one processor configured to execute instructions stored in the memory;
an information acquisition unit configured to acquire information regarding load distribution;
a determining unit configured to:
determine a processing load between the server and an end device by determining a portion of the processing load that is to be processed at the server and another portion of the processing load that is to be processed at the end device based at least in part on the information regarding load distribution, and
dynamically distribute the determined processing load between the server and the end device,
wherein the information regarding load distribution includes at least one of a status of a network between the server and the end device, a status of a battery of the end device, a capacity of the server, a capacity of the end device, cost information of the network and user preferences submitted via the end device;
a graphics processing unit (GPU) configured to process at least a portion of the dynamically distributed processing load; and
an instructing unit configured to instruct the end device to process at least other portion of the dynamically distributed processing load,
wherein each of the at least a portion of the dynamically distributed processing load is associated with one of a background object or a foreground object of a video scene, and each of the at least other portion of the dynamically distributed processing load is associated with another one of the background object or the foreground object of the video scene.

23. The server of claim 22, wherein the dynamically distributed processing load is associated with a graphical object.

24. The server of claim 23, wherein the graphics processing unit comprises a rendering unit configured to render the graphical object.

25. The server of claim 24, wherein the graphics processing unit comprises:
an encoding unit configured to encode the rendered graphical object into a data stream; and
a transmitting unit configured to transmit the data stream to the end device.

26. The server of claim 22, wherein the information acquisition unit is further configured to acquire the information regarding load distribution periodically.

27. The server of claim 22, wherein the information acquisition unit is further configured to receive the information regarding load distribution from the end device.

28. The server of claim 22, wherein the capacity of the server is associated with a number of end devices connected to the server.

29. A non-transitory computer-readable storage medium having stored thereon computer-executable instructions that, in response to execution, cause a server to perform operations, comprising:
processing, by the server, at least one frame of a first process group; and
providing an end device with at least one instruction to process at least one frame of a second process group based on at least one of a status of a network between the server and the end device, a status of a performance component of the end device, a capacity of the server, cost information of the network, and user preferences submitted via the end device,
wherein each of the at least one frame of the first process group is associated with one of a background object or a foreground object of a video scene, and each of the at least one frame of the second process group is associated with another one of the background object or the foreground object of the video scene.

30. The computer-readable storage medium of claim 29, wherein the first process group comprises at least one odd frame of video data and the second process group comprises at least one even frame of the video data.

31. The computer-readable storage medium of claim 30, wherein the at least one odd frame includes a first frame and the at least one even frame includes a second frame, and
wherein the processing includes rendering the first frame and transmitting the rendered first frame during a period of the first frame and the second frame.

32. The computer-readable storage medium of claim 31, wherein the at least one odd frame further includes a third frame, and
wherein the providing includes providing the end device with an instruction to render the second frame during a period of the second frame and the third frame.

33. The computer-readable storage medium of claim 29, wherein the server comprises a first processing unit that processes the at least one frame of the first process group, and
wherein the end device comprises a second processing unit that processes the at least one frame of the second process group.

34. The computer-readable storage medium of claim 33, wherein the server further comprises the second processing unit that processes at least one other frame of the first process group.

35. The computer-readable storage medium of claim 33, wherein the end device further comprises the first processing unit that processes at least one other frame of the second process group.

* * * * *